US012441192B2

(12) United States Patent
Kemmet et al.

(10) Patent No.: US 12,441,192 B2
(45) Date of Patent: Oct. 14, 2025

(54) BATTERY SYSTEM FOR TRANSPORT REFRIGERATION UNITS AND SUPPLEMENTAL BATTERY SYSTEM

(71) Applicant: Nivalis Energy Systems LLC, Hunt Valley, MD (US)

(72) Inventors: Ryan Kemmet, Phoenix, AZ (US); Dennis Townsend, Hunt Valley, MD (US)

(73) Assignee: NIVALIS ENERGY SYSTEMS LLC, Hunt Valley, MD (US)

( * ) Notice: Subject to any disclaimer, the term of this patent is extended or adjusted under 35 U.S.C. 154(b) by 106 days.

(21) Appl. No.: 18/458,577

(22) Filed: Aug. 30, 2023

(65) Prior Publication Data

US 2024/0075816 A1 Mar. 7, 2024

Related U.S. Application Data

(60) Provisional application No. 63/374,439, filed on Sep. 2, 2022.

(51) Int. Cl.
*B60L 1/00* (2006.01)
*B60H 1/32* (2006.01)
(Continued)

(52) U.S. Cl.
CPC .......... *B60L 1/003* (2013.01); *B60H 1/3226* (2013.01); *B60L 58/12* (2019.02); *B60L 58/16* (2019.02);
(Continued)

(58) Field of Classification Search
CPC .......... B60L 1/003; B60L 58/12; B60L 53/51; B60L 2210/10; B60L 2210/40;
(Continued)

(56) References Cited

U.S. PATENT DOCUMENTS

2015/0184912 A1* 7/2015 Nelson ............... B60H 1/00428
62/126
2023/0030897 A1* 2/2023 Choi ....................... B60L 53/53
(Continued)

FOREIGN PATENT DOCUMENTS

EP 1279907 A2 7/2002

*Primary Examiner* — Rexford N Barnie
*Assistant Examiner* — Duc M Pham
(74) *Attorney, Agent, or Firm* — Pauley Erickson & Swanson

(57) ABSTRACT

Methods and systems for powering a transport refrigeration unit (TRU) via one or more batteries when not connected to shore power are disclosed. The system may include one or more batteries configured to supply a DC battery voltage, an inverter/charger coupled to the one or more batteries and configured to convert the DC battery voltage to an AC output voltage for powering an electric motor coupled to a compressor of the TRU, and an electrical vehicle (EV) charging port coupled to one or more of the one or more batteries and the inverter/charger, the EV charging port configured to receive a charging voltage from an EV charger. In addition, methods and systems for providing supplemental power to a vehicle battery system are disclosed. The system may include one or more batteries and a DC/DC converter coupled to the one or more batteries and the vehicle battery system.

20 Claims, 8 Drawing Sheets

(51) Int. Cl.
*B60K 11/02* (2006.01)
*B60L 53/16* (2019.01)
*B60L 53/51* (2019.01)
*B60L 58/12* (2019.01)
*B60L 58/16* (2019.01)
*B60P 3/20* (2006.01)
*H02J 3/32* (2006.01)
*H02J 3/38* (2006.01)
*H02P 27/06* (2006.01)

(52) U.S. Cl.
CPC ............... *H02J 3/32* (2013.01); *H02J 3/38* (2013.01); *H02P 27/06* (2013.01); *B60K 11/02* (2013.01); *B60L 53/16* (2019.02); *B60L 53/51* (2019.02); *B60L 2210/10* (2013.01); *B60L 2210/30* (2013.01); *B60L 2210/40* (2013.01); *B60P 3/20* (2013.01); *H02J 2300/26* (2020.01)

(58) Field of Classification Search
CPC ...... B60H 1/3226; H02J 3/32; H02J 2300/26; H02P 27/06; B60K 11/02; B60P 3/20
See application file for complete search history.

(56) References Cited

U.S. PATENT DOCUMENTS

| | | | |
|---|---|---|---|
| 2023/0109561 A1* | 4/2023 | De Menezes | H02J 9/065 |
| | | | 315/86 |
| 2023/0187960 A1* | 6/2023 | Cronin | B60L 53/66 |
| | | | 320/136 |
| 2023/0347841 A1* | 11/2023 | Hunley | B60W 10/26 |

* cited by examiner

BATTERY SYSTEM FOR TRANSPORT REFRIGERATION UNITS AND SUPPLEMENTAL BATTERY SYSTEM

CROSS REFERENCE TO RELATED APPLICATIONS

This application claims benefit of U.S. Provisional Patent Appln. No. 63/374,439 filed on Sep. 2, 2022, the entirety of which is incorporated herein by reference.

TECHNICAL FIELD

The present disclosure relates generally to the field of transport refrigeration systems and methods of operating the same, and more particularly to the integration of disparate power sources and/or energy storage devices for transport refrigeration units (TRUs).

BACKGROUND

Refrigeration trucks provide an effective means of long distance transport for perishable goods. Power requirements for maintaining the perishable load encompass a compressor for circulating refrigerant and a fan for circulation of temperature controlled air. A TRU may be attached to the front of a trailer for maintaining controlled temperatures during transport. Often, the TRU receives power from the tractor while in motion. Typically, the TRU is powered by a small diesel engine that is integral with the refrigeration system on the trailer. Many trailers are fitted with hybrid TRUs that allow the small engine to operate when the truck is in-motion and from an external utility source (i.e., "shore power") when stationary.

SUMMARY

Methods and systems for powering a transport refrigeration unit (TRU) via one or more batteries when not connected to shore power are disclosed. The system may include one or more batteries configured to supply a DC battery voltage, an inverter/charger coupled to the one or more batteries and configured to convert the DC battery voltage to an AC output voltage for powering an electric motor coupled to a compressor of the TRU, and an electrical vehicle (EV) charging port coupled to one or more of the one or more batteries and the inverter/charger, the EV charging port configured to receive a charging voltage from an EV charger.

In addition, methods and systems for providing supplemental power to a vehicle battery system are disclosed. The system may include one or more batteries and a DC/DC converter coupled to the one or more batteries and the vehicle battery system.

BRIEF DESCRIPTION OF DRAWINGS

Other objects and advantages of the present disclosure will become apparent to those skilled in the art upon reading the following detailed description of exemplary embodiments and appended claims, in conjunction with the accompanying drawings, in which like reference numerals have been used to designate like elements, and in which:

The figures are for purposes of illustrating example embodiments, but it is understood that the inventions are not limited to the arrangements and instrumentality shown in the drawings. In the figures, identical reference numbers identify at least generally similar elements.

DETAILED DESCRIPTION

The present disclosure describes systems, methods, and apparatuses configured to provide multiple and stand-alone power options for maintaining refrigeration trailers in an existing footprint commonly used by conventional diesel powered and/or hybrid TRUs.

Conventional approaches suffer from the shortcoming that the addition of a dedicated engine solely for accommodating the refrigeration load increases pollution, cost, and maintenance by introducing a separate fossil-fuel based combustion source into the transportation overhead. The modern trend toward "green" business practices identifies diesel engines of freight trucks as a major contributor of pollution. In observing the necessary role played by diesel based transport in the national economy, the Federal Government has mandated provisions to prohibit excessive idling of freight trucks to at least mitigate pollution.

Existing trailer fleets are in need of on-route electrification to reduce emissions. Examples described herein include the addition of one or more batteries and power electronics to a trailer to supply electric power for a fully electric TRU. In addition, and in light of potential shortages of new trailers as well as reluctance to make significant modifications to trailers while they are in service, this disclosure contemplates that it may be faster to retrofit existing trailers and provide shore power to existing hybrid TRUs while on-route. Accordingly, other examples described herein include the addition of one or more batteries and power electronics to a trailer to provide shore power (i.e., high voltage 480 VAC 3 phase) while on-route (e.g., "mobile shore power") making use of the existing TRU and conventional shore power connections on the vehicle. This may allow operators to keep existing diesel engines in place to use as back-up and remove the retrofit system at a later date. The one or more batteries and power electronics may be able to charge from standard electrical vehicle (EV) charging ports, such as Electric Vehicle Supply Equipment (EVSE) connections. In another aspect of the present disclosure, a supplemental battery system for a vehicle battery pack is disclosed.

The present disclosure will now be described more fully hereinafter with reference to the accompanying drawings, which form a part hereof, and which show, by way of non-limiting illustration, certain examples. Subject matter may, however, be described in a variety of different forms and, therefore, covered or claimed subject matter is intended to be construed as not being limited to any examples set forth herein. Among other things, subject matter may be described as methods, devices, components, or systems. Accordingly, examples may take the form of hardware, software, firmware or any combination thereof (other than software per se). The following detailed description is, therefore, not intended to be taken in a limiting sense.

Figure 1:
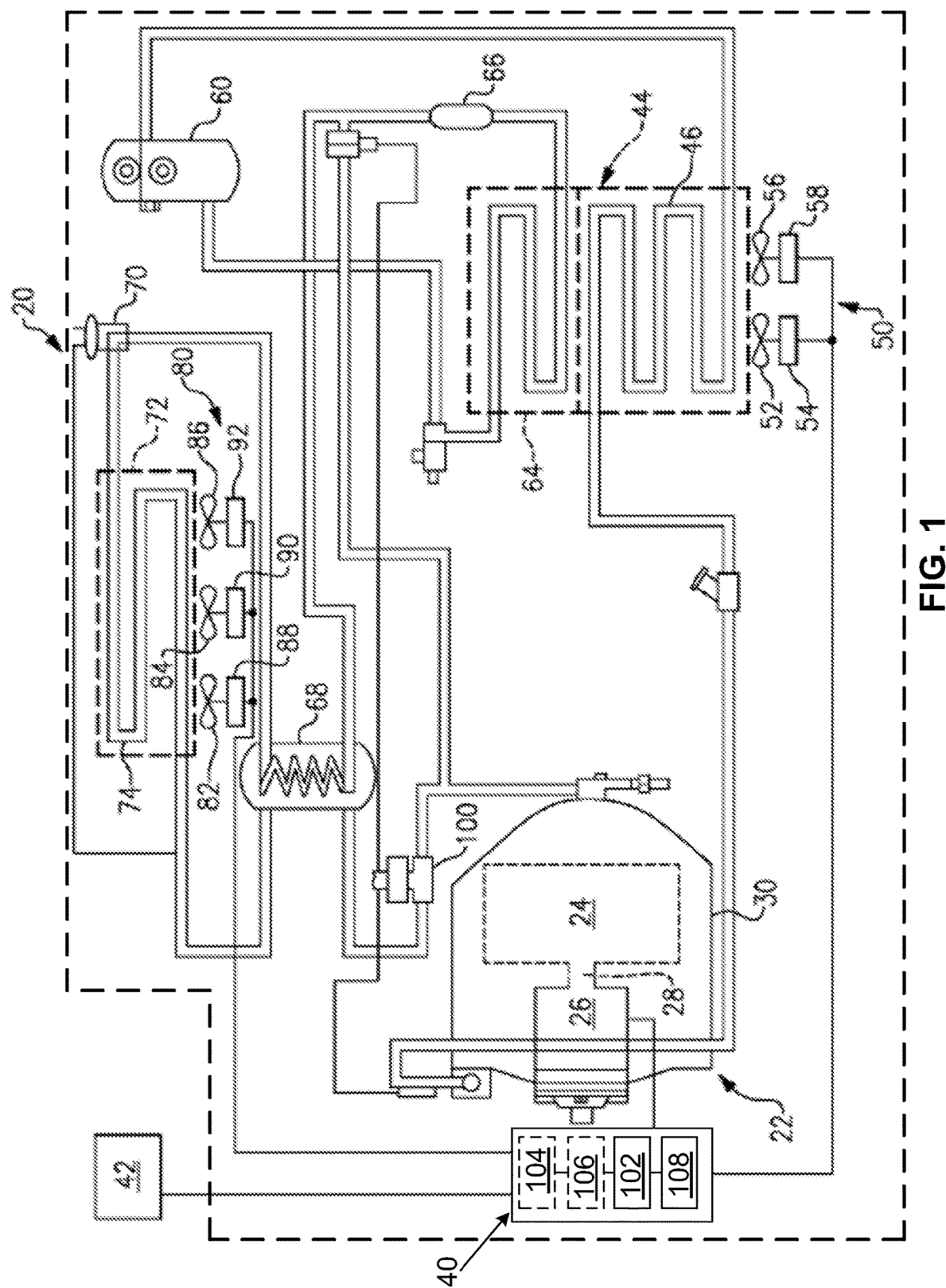
FIG. 1 is a diagram illustrating an exemplary transport refrigeration unit and power supply system, according to an embodiment of the present disclosure.

Referring now to FIG. 1, a diagram illustrating an exemplary TRU 20 and one or more power supply systems 42 is shown. The TRU 20 shown in FIG. 1 is meant for illustrative purposes and is not intended to limit the present disclosure. Different configurations and components may be used for the TRU 20 and still fall within the scope of the present disclosure.

The TRU 20 may include a compressor system 22. The compressor system 22 may include a compressor 26, a compression chamber 24, and a compression mechanism. Optionally, the compressor system 22 may be sealed within a common housing 30.

A power delivery system 40 may be connected to and/or incorporated within the TRU 20 and may be capable of driving the compressor 22 in one or more ways, as described below. The power delivery system 40 may also provide power to satisfy electrical requirements of other portions of the TRU 20. In an example, the power delivery system 40 may integrate one or more power supply systems 42 into the TRU 20. The power delivery system 40 may include a controller that may be used to control power usage in the TRU 20.

Refrigerant may enter the compressor 22 and may be compressed to a higher temperature and pressure. Refrigerant gas may then move into an air-cooled condenser 44. Air flowing across a group of condenser coil fins and tubes 46 may cool the gas to its saturation temperature. The air flow across the condenser 44 may be energized by a condenser fan assembly 50 having one or more fans. The illustrated example includes a fan 52, an electrical condenser fan motor 54, and a second fan 56 having an electrical motor 58. The controller within the power delivery system 40 may regulate a power supply to one or more of the electrical condenser fan motor 54 and the electrical motor 58.

By removing latent heat, the gas may condense to a high pressure/high temperature liquid and flow to a receiver 60 that may provide storage for excess liquid refrigerant during low temperature operation. From the receiver 60, the liquid refrigerant may pass through a subcooler heat exchanger 64, through a filter dryer 66 that may keep the refrigerant cool and dry, then to a heat exchanger 68 that may increase the refrigerant subcooling, and then pass to a thermostatic expansion valve 70.

As the liquid refrigerant passes through the expansion valve 70, some of it may vaporize into a gas. Return air from the refrigerated space may flows over the heat transfer surface of an evaporator 72. As refrigerant flows through tubes 74 in the evaporator 72, the remaining liquid refrigerant may absorb heat from the return air, and in so doing, may be vaporized. The air flow across the evaporator may be energized by an evaporator fan assembly 80. The illustrated example includes a first fan 82, a second fan 84, and a third fan 86 that may be respectively powered by a first electric fan motor 88, a second electric fan motor 90, and a third electric fan motor 92. The first electric fan motor 88, the second electric fan motor 90, and the third electric fan motor 92 may receive their electrical power from at least one of the one or more power supply systems 42 and/or the power delivery system 40. The controller within the power control system 42 may control the consumption of power and operations of the first electric fan motor 88, the second electric fan motor 90, and the third electric fan motor 92 of the evaporator fan assembly.

Refrigerant vapor may flow through a suction modulation valve 100 back to the compressor system 22 and the compressor 26. A thermostatic expansion valve bulb or sensor may be located on the evaporator outlet tube. The bulb may control the thermostatic expansion valve 70, to control refrigerant super-heating at the evaporator outlet tubing.

In an example, the power delivery system 40 may include only an electric motor 102 directly mechanically coupled to the compressor 26. In another example, the power delivery system 40 may include a dedicated engine 104 (e.g., an internal combustion engine ("ICE")) and the electric motor 102. The engine 104 and/or the electric motor 102 may be directly mechanically coupled to the compressor 26. While the horsepower of the engine 104 may vary, in one example it is contemplated that the engine 104 may have approximately 20 to approximately 25 horsepower. The electric motor 102 may be a three phase 480 AC motor or a permanent magnet motor.

If the power delivery system 40 includes the dedicated engine 104, it may also include an internal generator 106 that is driven by the dedicated engine 104. The internal generator 106 may be a 120 volt AC generator capable of a power output of approximately 3 to approximately 3.5 kw. In an example, the internal generator 106 may be coupled to the electric motor 102 and may be used to power one of more of the electric motor 102 and other electronics within the TRU 20 and on the vehicle itself.

The power delivery system 40 may include a soft starter 108 coupled to the compressor 26. The soft starter 108 may be configured to temporarily reduce the load and torque in the powertrain and electric current surge of the electric motor 102 during start-up.

Additionally or alternatively, the electric motor 102 may be coupled to the one or more power supply systems 42. The one or more power supply systems 42 may include one or more of a main generator powered by the main engine of a vehicle connected to the trailer, one or more batteries, and shore power. The power delivery system 40 may be capable of switching (either manually or automatically) between one or more of the internal generator 106 and the one or more power supply systems 42, For example, the electric motor 102 may be powered by one of the one or more of the batteries, the internal generator 106, and the main generator while the trailer is moving and one of the one or more batteries, the internal generator 106, and the shore power when the trailer is stationary and plugged into an electrical connection. In an example, the electric motor 102 may completely bypass the internal generator 106 altogether, allowing for the dedicated engine 104 to remain unused or be completely removed from the TRU 20 altogether.

Figure 2:
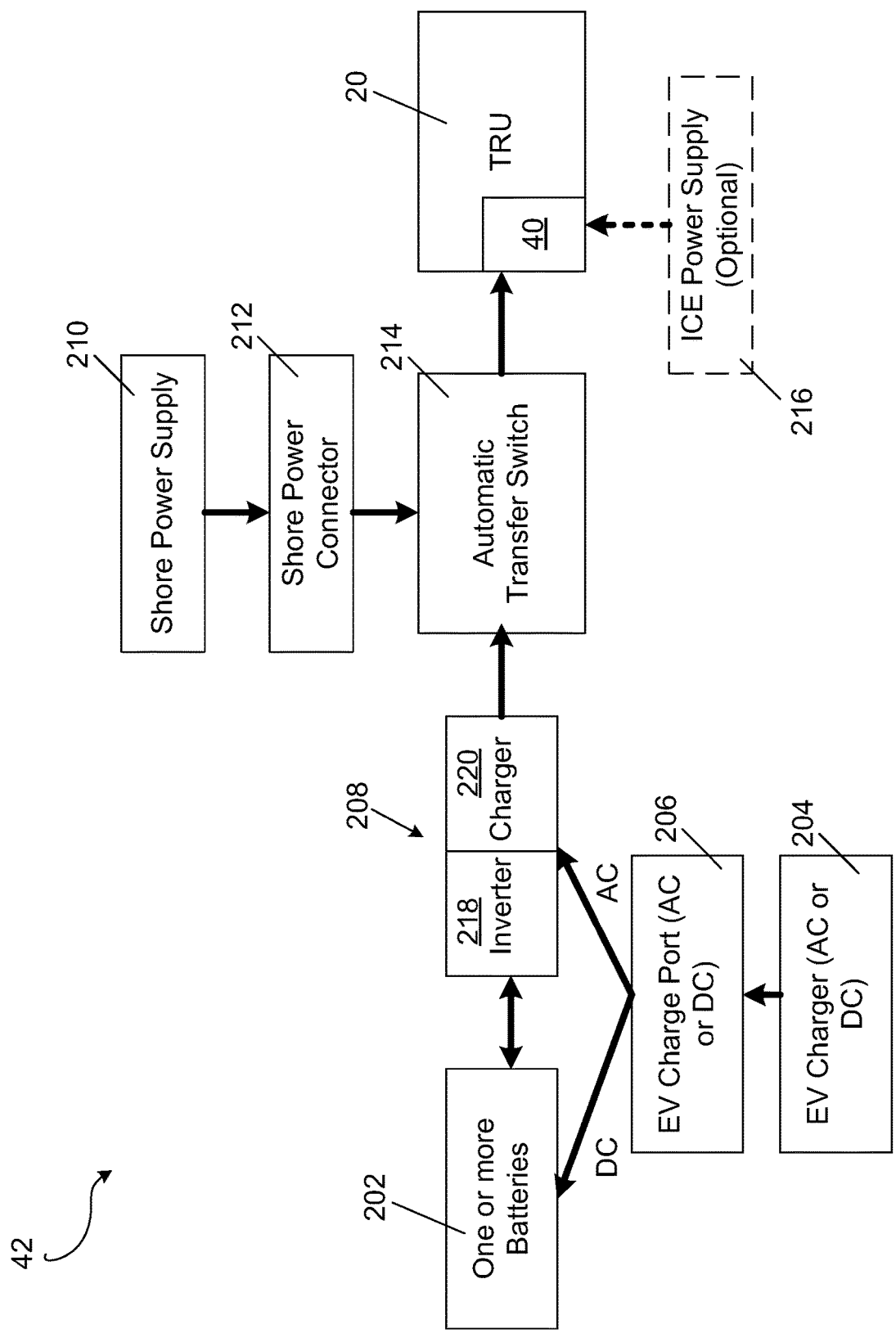
FIG. 2 is an overall system diagram of a first example power supply system, according to an embodiment of the present disclosure.

Referring now to FIG. 2, an overall system diagram of a first example of the one or more power supply systems 42 is shown. The first example of the one or more power supply systems 42 may include one or more batteries 202. The one or more batteries 202 may be charged by a conventional EV charger 204. If the EV charger 204 uses DC, the one or more batteries 202 may be directly connected to the EV charger through an EV charge port 206. If the EV charger 204 uses AC, the one or more batteries 202 may connected to an inverter/charger 208 that is connected to the EV charge port 206. In an example, the inverter/charger 208 may be a single component capable of converting AC power from the EV charger 204 to DC power for the one or more batteries 202 to charge them and also convert DC power from the one or more batteries 202 to AC power to output to the TRU 20. In another example, the inverter/charger 208 may be made up of two separate components, an inverter 218 and a charger 220. The charger 220 may convert AC power from the EV charger 204 to DC power for the one or more batteries 202 to charge them. The inverter may convert DC power from the one or more batteries 202 to AC power to output to the TRU 20. A shore power supply 210 may be provided by a shore power connector 212. In this example, the shore power connector 212 may be connected to an automatic transfer switch (ATS) 214 that can automatically switch a source of power to the TRU 20 between the one or more batteries 202 and the shore power 210. In an example, the ATS 214 may be connected to the TRU 20 via a conventional shore power connection. As described above, an existing TRU 20 may be used and the TRU 20 may optionally be connected to a generator coupled to an ICE 216 (either a dedicated ICE within the TRU 20 or the ICE of a vehicle coupled to the trailer).

Figure 3:
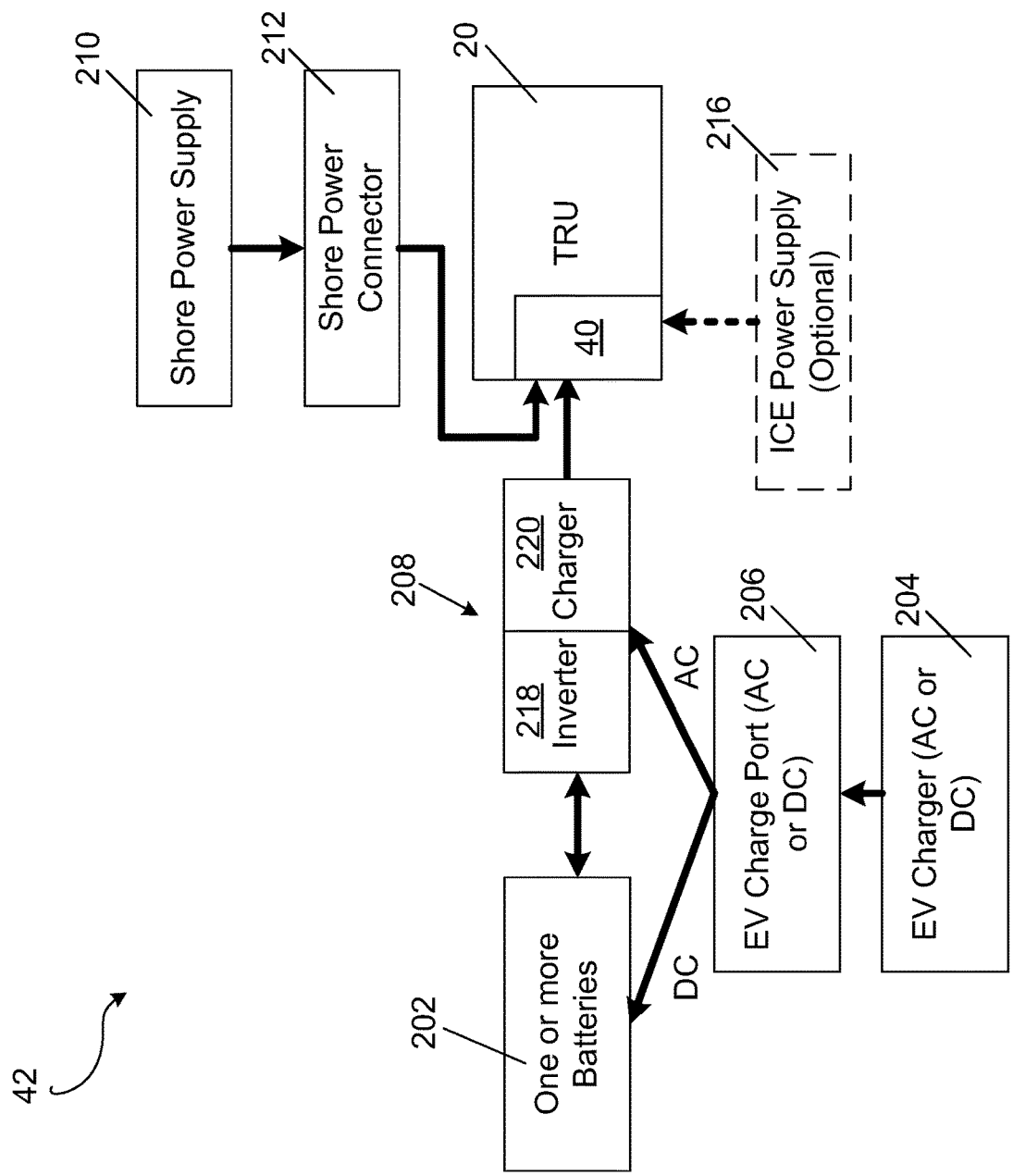
FIG. 3 is an overall system diagram of a second example power supply system, according to an embodiment of the present disclosure.

Referring now to FIG. 3, an overall system diagram of a second example of the one or more power supply systems 42 is shown. The second example of the one or more power supply systems 42 is similar to the first example of the one or more power supply systems 42 and shares the same components. However, in the second example of the one or more power supply systems 42, there is no ATS 214 and the shore power supply is connected directly to the TRU 20 through the shore power connector 212. In an example, the inverter/charger 208 may be connected to the TRU 20 via a conventional shore power connection. In this example, switching between the one or more batteries 202 and the shore power supply 210 may be done manually. As described above, an existing TRU 20 may be used and the TRU 20 may optionally be connected to the ICE 216.

Figure 4:
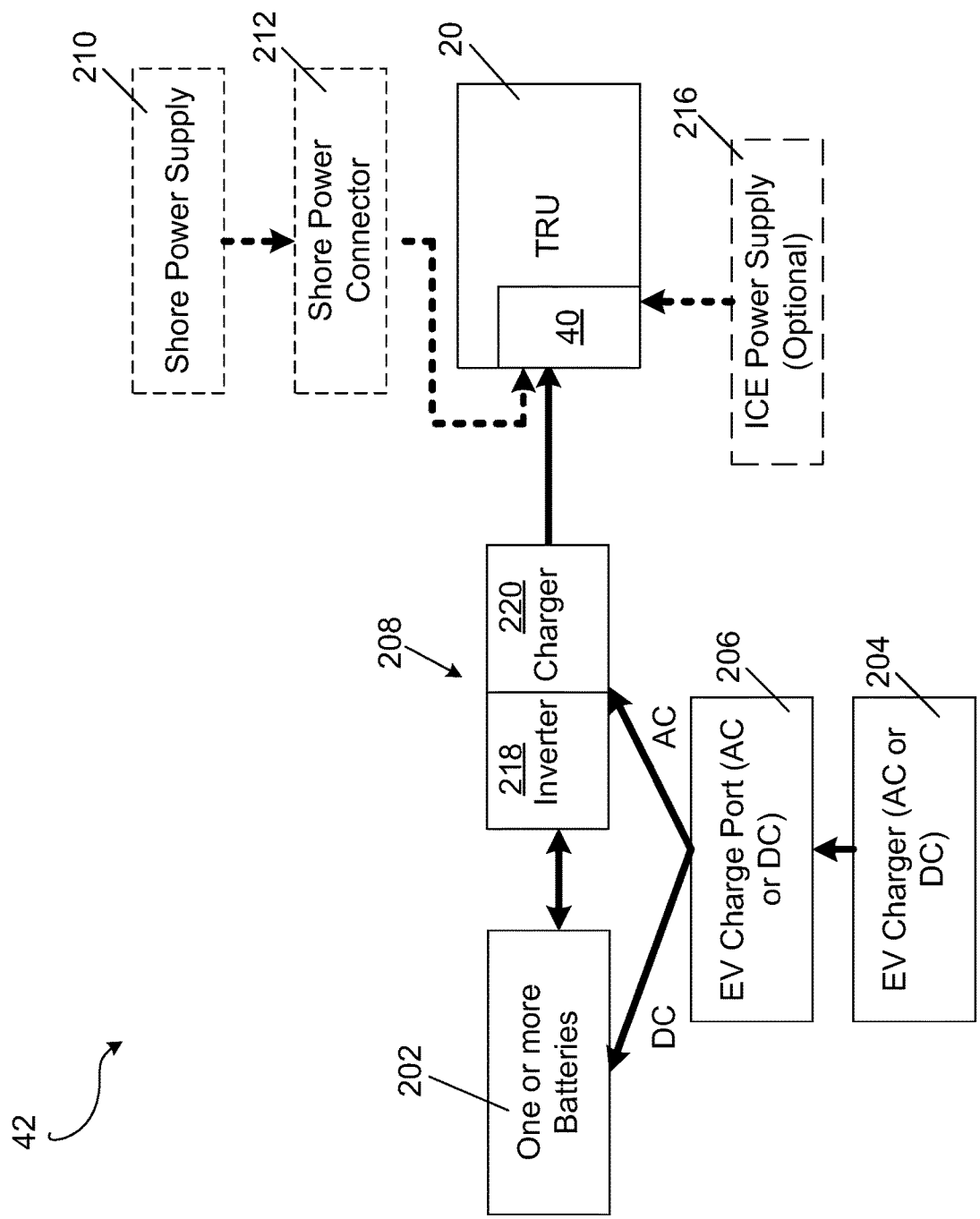
FIG. 4 is an overall system diagram of a third example power supply system, according to an embodiment of the present disclosure.

Referring now to FIG. 4, an overall system diagram of a third example of the one or more power supply systems 42 is shown. The third example of the one or more power supply systems 42 is similar to the first example of the one or more power supply systems 42 and shares the same components. However, in the third example of the one or more power supply systems 42, the TRU 20 may optionally be connected to the shore power connector 212 and optionally connected to the ICE 216. In an example, the TRU 20 may not be connected to the shore power supply 210 or the ICE 216 at all and may rely solely on power from the one or more batteries 202 (i.e., fully electric). In an example, the inverter/charger 208 may be connected to the TRU 20 via a conventional shore power connection.

Figure 5:
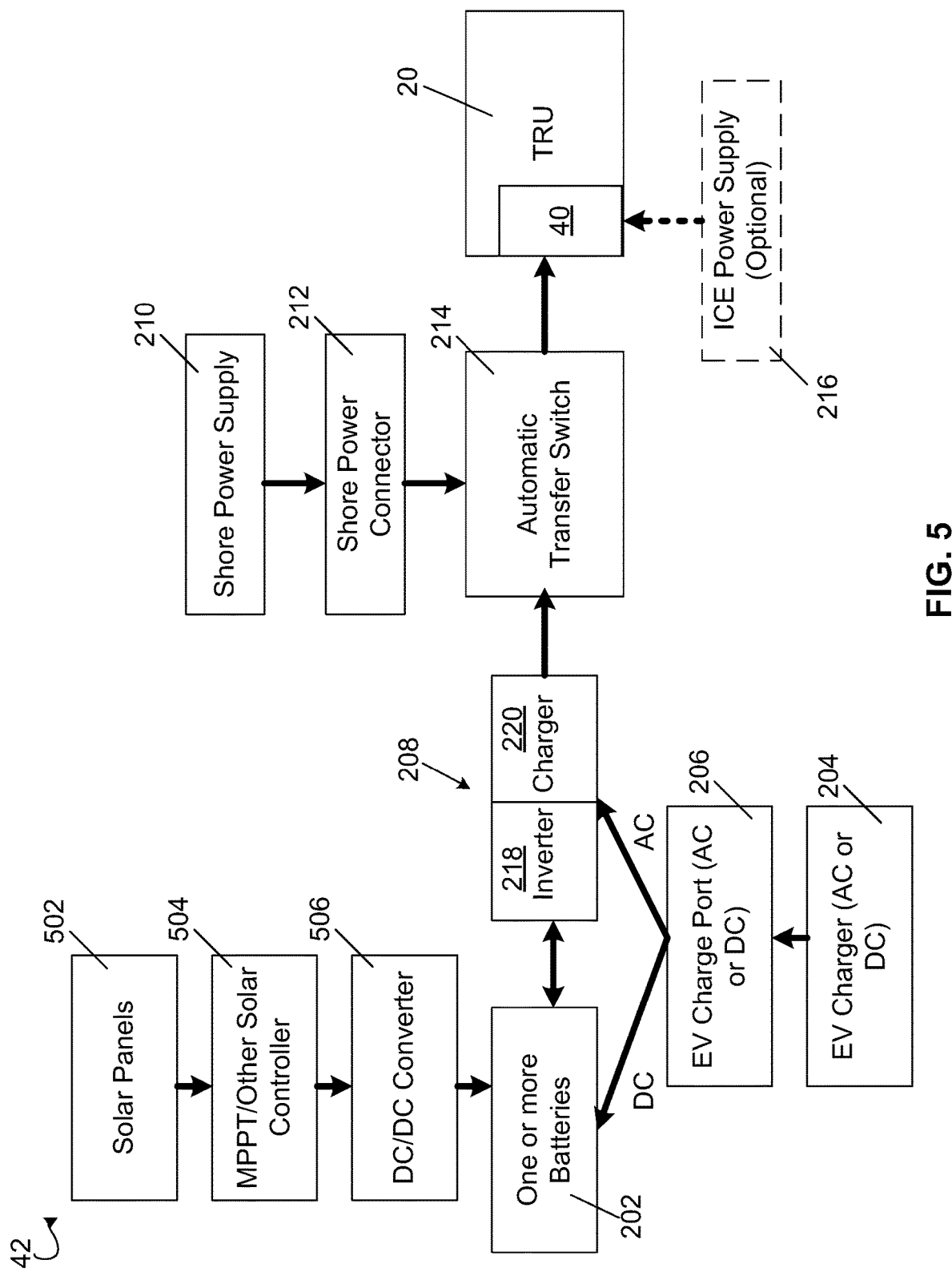
FIG. 5 is an overall system diagram of a fourth example power supply system, according to an embodiment of the present disclosure.

Referring now to FIG. 5, an overall system diagram of a fourth example of the one or more power supply systems 42 is shown. The fourth example of the one or more power supply systems 42 is similar to the first example of the one or more power supply systems 42 and shares the same components. However, in the fourth example of the one or more power supply systems 42, one or more solar panels 502 that produce DC current may be affixed to the trailer and may charge the one or more batteries 202. The one or more solar panels 502 may be connected in series or parallel. The one or more solar panels 502 may be connected to a controller 504 that is configured to regulate the charging process and ensure that the one or more batteries 202 are charged correctly and/or are not over-charged. In an example, the controller 504 may be a pulse width modulation (PWM) solar charge controller and may use a basic rapid switch to modulate or control charging.

In another example, the controller may be a maximum power point tracking (MPPT) controller. In order to generate the most power, the MPPT controller 504 may sweep through the panel voltage to find the best combination of voltage and current to produce the maximum power. The MPPT controller may continually track and adjusts the photovoltaic voltage to generate the most power, no matter what time of day or weather conditions. The operating efficiency may be up to 30% more compared to a PWM charge controller 504.

A DC/DC converter 506 may be used to optimize the match between the one or more solar panels 502 and the one or more batteries. The DC/DC converter 506 may adjust a DC output voltage from the one or more solar panels 502 down to a voltage for charging the one or more batteries 202.

Figure 6:
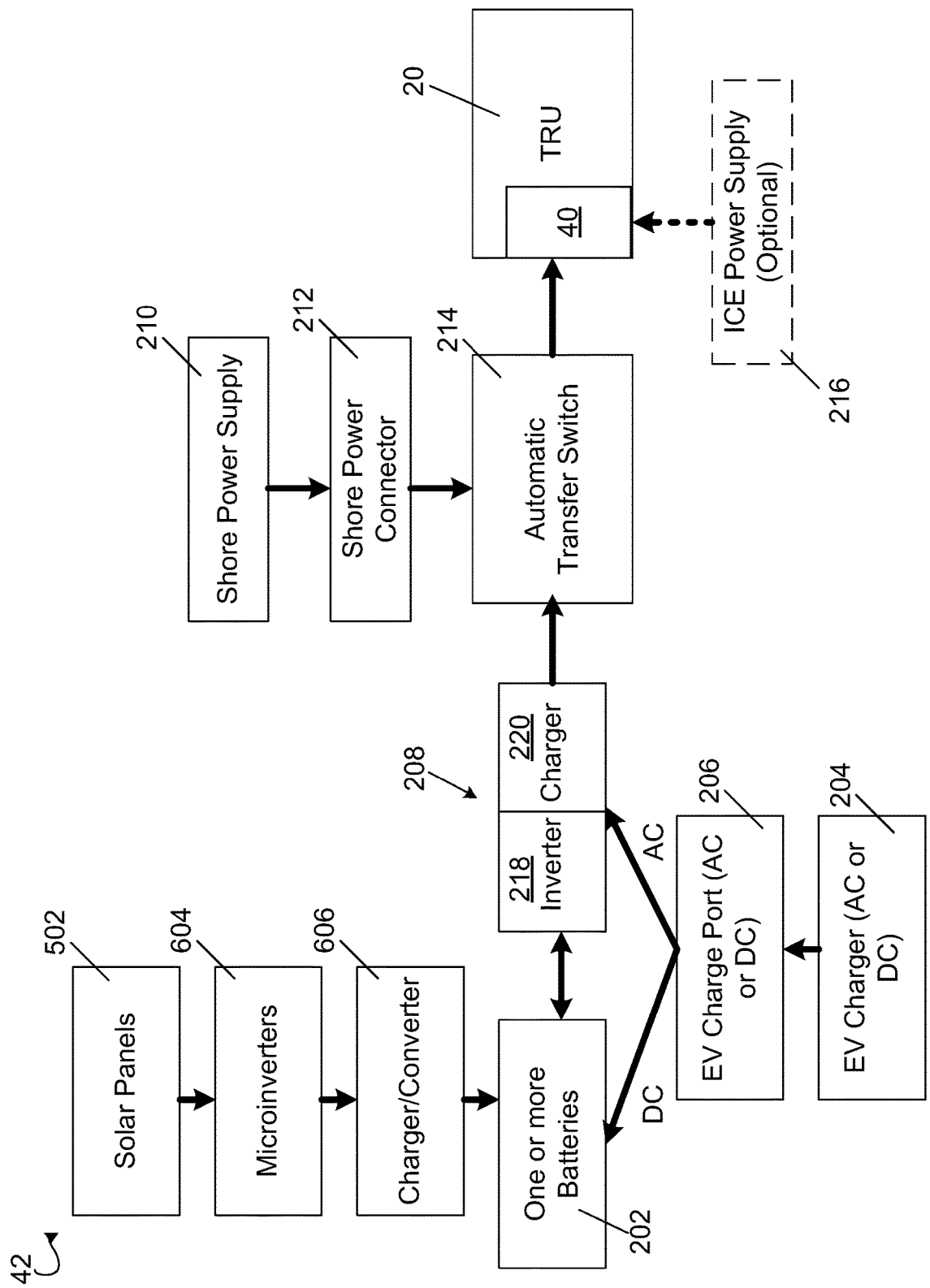
FIG. 6 is an overall system diagram of a fifth example power supply system, according to an embodiment of the present disclosure.

Referring now to FIG. 6, an overall system diagram of a fifth example of the one or more power supply systems 42 is shown. The fifth example of the one or more power supply systems 42 is similar to the first example of the one or more power supply systems 42 and shares the same components. However, in the fifth example of the one or more power supply systems 42, one or more solar panels 502 that produce DC current may be affixed to the trailer and may charge the one or more batteries 202. The one or more solar panels 502 may be connected in series or parallel. In an example, the one or more solar panels 502 may be connected to one or more microinverters 604 configured to convert the DC solar panel voltage into 240 AC. In another example, the one or more microinverters 604 may be integrated directly into the one or more solar panels 502. Any ratio of the one or more one or more microinverters 604 to the one or more solar panels 502 may be used. For example, there may be 1-2 solar panels 502 per microinverter 604. The one or more microinverters 604 may be connected to a charger/converter 606 configured to invert the AC voltage to DC voltage and deliver a correct voltage to charge the one or more batters 202.

Figure 7:
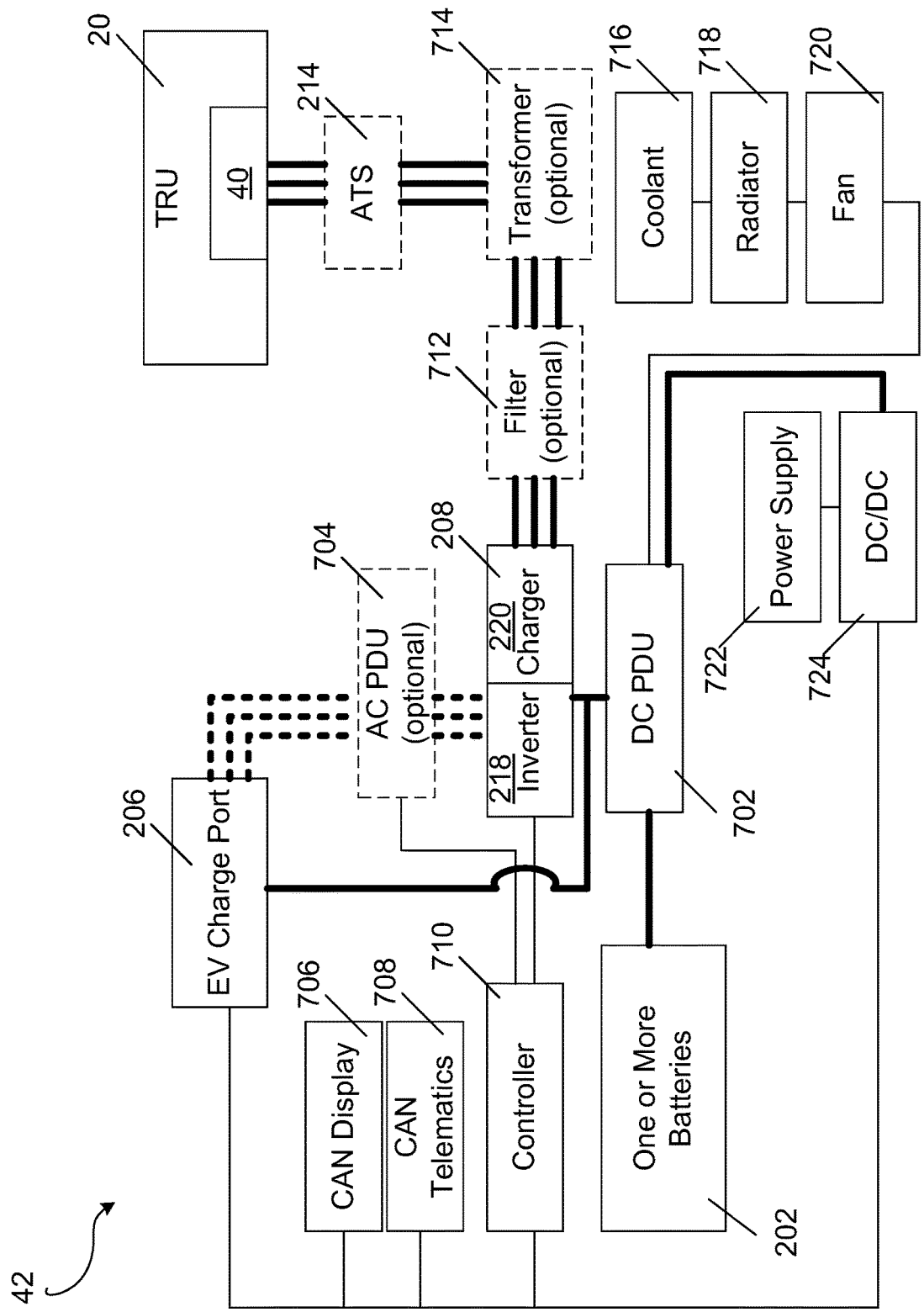
FIG. 7 is a system architecture diagram of the power supply system, according to an embodiment of the present disclosure.

Referring now to FIG. 7, a system architecture diagram of the one or more power supply systems 42 is shown. The one or more batteries 202 may include a battery management system. The one or more batteries 202 may be modular. In an example, the one or more batteries 202 may have a 136 kWh capacity and may provide approximately 360-500 VDC with a nominal voltage of 440 VDC. The one or more batteries may be connected to a DC power distribution unit (DC PDU) 702. The DC PDU 702 may include and/or may be connected to a fan 720 and a radiator 718 that includes coolant 716. The DC PDU 702 may be connected to a DC/DC converter 724, which itself may be connected to a power supply 722 (e.g., a 12 volt battery).

The DC/DC converter 724 may be connected to a controller 710. Both the DC/DC converter 724 and controller 710 may be connected to a Controller Area Network (CAN) telematics 708, CAN display 706, and the EV charge port 206. The EV Charge port 206 may deliver AC or DC power. In an example, the EV charge port 206 may be one or more of a Combined Charging System (CCS) port and a J1772 plug. The controller 710 may also be connected to the inverter/charger 208, which itself may be connected to the DC PDU 702 and the EV charge port 206. In some examples the inverter/charger 208 may only function as an inverter and may deliver power (e.g., three phase power) that originates from the one or more batteries 202 to the TRU 20. In other examples, the inverter/charger 208 may functions as an inverter as above and also as a charger for the one or more batteries 202. If the power supply from the EV charge port 206 is AC, an optional AC PDU 704 may be connected to the EV charge port 206, the controller 710 and the inverter/charger 208.

The inverter/charger 208 may output three phase power to power the TRU 20. In an example, the output of the inverter/charger 208 may require additional filtering to make it usable and an optional filter 712 may be connected to the inverter/charger 208. In another example, an optional transformer 714 may be connected to the inverter/charger 208 in order to adjust the output of the inverter/charger 208 to a correct voltage (e.g., approximately 220 to 460 AC). As described above, an example of the one or more power supply systems 42 may include the ATS 214. In the one or more power supply systems 42 that includes the ATS 214, a shore power supply (not shown) may be connected to the ATS 214. In the one or more power supply systems 42 that does not include the ATS 214, the shore power supply (not shown) may be connected to the TRU 20. In addition, a fuel driven prime mover (not shown) may be connected to the TRU 20.

In an example, the one or more power supply systems 42 may deliver approximately 80 VAC at 60 Hz to the TRU 20 and may provide 90 Locked Rotor Amps (LRA) within 50 ms of startup. It may provide a maximum continuous 22 Amps, 9 kW maximum average and 11 Amps.

Figure 8:
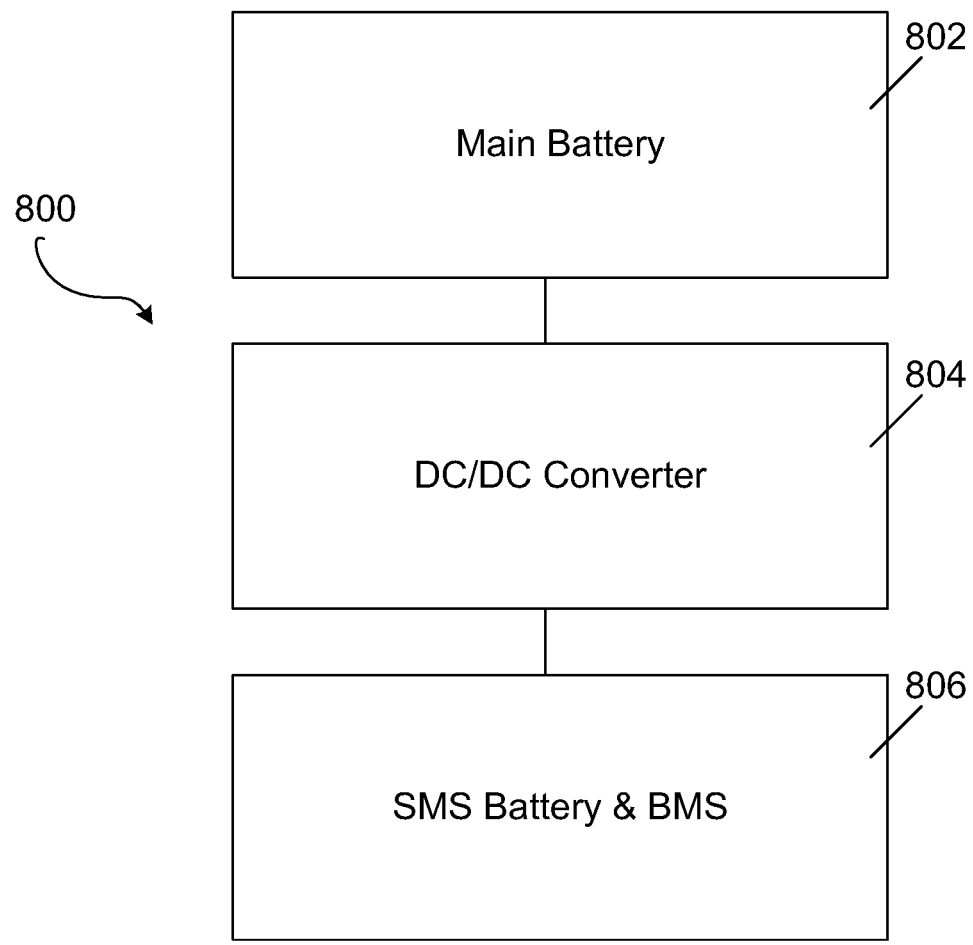
FIG. 8 is a diagram of a supplemental battery system (SBS), according to an embodiment of the present disclosure.

Referring now to FIG. 8, a diagram of a supplemental battery system (SBS) 800 is shown. The SBS 800 may be connected to an existing battery electric vehicle system (i.e., main battery) 802 via a connector. In applications where extra battery capacity is needed only a portion of the time, the SBS may be added used on an as needed basis. In applications where the main battery 802 has achieved their degraded life (e.g., 80%), for example before the warranty period expires, the SBS 800 may be used to provide extra capacity to effectively create a longer usable life of the product. The SBS 800 may also be used as a quick charge mechanism. By swapping, adding, or replacing the SBS 800 additional energy may be added to a system. The SBS 800 may not replace the main battery 802 in a system.

The SBS 800 may include one or more batteries 806. The one or more batteries 806 may include a battery management system (BMS). The BMS may ensure that the one or more batteries 806 and/or the main battery 802 are protected and any operation out of their safety limit sis prevented. The BMS may monitor a state of charge (SOC) along with a state of health (SOH) of the one or more batteries 806 and/or the main battery 802. The SBS 800 may also include a DC/DC converter 804 between the main battery 802 and the one or more batteries 806. The DC/DC converter 804 may be used to ensure the voltage output of the one or more batteries 806 is compatible with the voltage of the main battery 802. In an example, the DC/DC converter 804 may be separate from the one or more batteries 806 and may be installed (e.g., permanently) elsewhere on the vehicle. In an example, the SBS 800 may be a low voltage unit (e.g., less than approximately 60 VDC) to allow it to be safely transported already charged and swapped.

The SBS 800 may provide one or more of capacity extension and life extension for the main battery 202. In an example, a capacity of the SBS 800 may be additive to the capacity of the main battery 202. In situations where the capacity of the main battery 202 has decreased (e.g., over time, through use, or due to environmental conditions) the SBS 800 may increase a total capacity of the existing battery electric vehicle system by adding additional batteries at a later date from initial manufacture.

The methods described herein, including those with reference to one or more flowcharts, may be performed by a controller and/or processing device (e.g., smartphone, computer, etc.). The methods may include one or more operations, functions, or actions as illustrated in one or more of blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation. Dashed lines may represent optional and/or alternative steps.

Additional examples of the presently described method and device embodiments are suggested according to the structures and techniques described herein. Other non-limiting examples may be configured to operate separately or may be combined in any permutation or combination with any one or more of the other examples provided above or throughout the present disclosure. Components and/or arrangement of components illustrated in one figure may be incorporated into any other figure.

It will be appreciated by those skilled in the art that the present disclosure may be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The terms "including" and "comprising" should be interpreted as meaning "including, but not limited to." If not already set forth explicitly in the claims, the term "a" should be interpreted as "at least one" and the terms "the, said, etc." should be interpreted as "the at least one, said at least one, etc."

The present disclosure is described with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks may occur out of the order noted in the operational illustrations. For example, two blocks shown in succession may be executed substantially concurrently or the blocks may sometimes be executed in the reverse order, depending upon the functionality/acts involved.

For the purposes of this disclosure a non-transitory computer readable medium (or computer-readable storage medium/media) stores computer data, which data may include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which may be used to tangibly store the desired information or data or instructions and which may be accessed by a computer or processor.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

It is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A system for powering a transport refrigeration unit (TRU), the system comprising:
   one or more batteries configured to supply a DC battery voltage;
   an inverter/charger coupled to the one or more batteries and configured to convert the DC battery voltage to an AC output voltage for powering an electric motor, the electric motor coupled to a compressor of the TRU;
   an automatic transfer switch (ATS) connected to the inverter/charger, the electric motor, and a shore power connector, the ATS configured to automatically switch power delivery to the electric motor between the AC output voltage and an AC shore power supply voltage; and
   an electrical vehicle (EV) charging port coupled to one or more of the one or more batteries and the inverter/charger, the EV charging port configured to receive a charging voltage from an EV charger.

2. The system of claim 1, wherein the EV charger is configured to provide a DC charging voltage and the EV charging port is connected directly to the one or more batteries.

3. The system of claim 1, wherein the EV charger is configured to provide an AC charging voltage, and the EV charging port is connected directly to the inverter/charger.

4. The system of claim 3, wherein the inverter/charger is further configured to:
   transfer the AC charging voltage from the EV charger to the electric motor.

5. The system of claim 3, wherein the inverter/charger is further configured to:
   convert the AC charging voltage from the EV charger to DC charging voltage for charging the one or more batteries.

6. The system of claim 5, wherein the inverter/charger is a single component.

7. The system of claim 5, wherein the inverter/charger comprises a charger component and a separate inverter component.

8. The system of claim 1, further comprising an internal combustion engine coupled to the compressor.

9. The system of claim 8, wherein a power delivery system of the TRU is configured to switch a delivery of power to the compressor between the internal combustion engine and the electric motor.

10. A system for powering a transport refrigeration unit (TRU), the system comprising:
    one or more batteries configured to supply a DC battery voltage;
    an inverter/charger coupled to the one or more batteries and configured to convert the DC battery voltage to an AC output voltage for powering an electric motor, the electric motor coupled to a compressor of the TRU;
    an electrical vehicle (EV) charging port coupled to one or more of the one or more batteries and the inverter/charger, the EV charging port configured to receive a charging voltage from an EV charger;
    a DC voltage power distribution unit (PDU) coupled to the one or more batteries, the inverter/charger, and the EV charging port; and
    a DC/DC converter coupled to the DC voltage PDU the EV charging port, a controller, a Controller Area Network (CAN) telematics, and a CAN display.

11. The system of claim 10, further comprising:
    an automatic transfer switch (ATS) connected to the inverter/charger, the electric motor, and a shore power connector, the ATS configured to automatically switch power delivery to the electric motor between the AC output voltage and an AC shore power supply voltage.

12. The system of claim 10, further comprising:
    a fan and a radiator containing coolant coupled to the DC voltage PDU.

13. The system of claim 10, wherein the EV charger is configured to provide AC charging voltage and the EV charging port, the inverter/charger, and the controller are coupled to an AC voltage PDU.

14. The system of claim 10, further comprising one or more of a filter and a transformer coupled to the inverter/charger and the TRU.

15. The system of claim 1, wherein the AC output voltage is three phase AC voltage.

16. The system of claim 1, further comprising:
one or more solar panels configured to generate a DC output voltage;
a maximum power point tracking (MPPT) controller coupled to the one or more solar panels, the MPPT controller configured to maximize an efficiency of the DC output voltages; and
a DC/DC converter coupled to the MPPT controller, the DC/DC converter configured adjust the DC output voltage to a voltage for charging the one or more batteries.

17. The system of claim 1, further comprising:
one or more solar panels configured to generate a DC output voltage;
one or more microinverters couped to the one or more solar panels, the one or more microinverters configured to convert the DC output voltage to an AC voltage; and
a charger/converter couple to the one or more microinverters, the charger/converter configured to invert the AC voltage to a DC voltage for charging the one or more batteries.

18. The system of claim 1, wherein the one or more batteries configured to supply a DC battery voltage comprises a main battery, and further comprising a supplemental battery system including:
one or more supplemental batteries;
a battery management system (BMS) configured to monitor a state of charge (SOC) and a state of health (SOH) of one or more of the one or more supplemental batteries and the main battery; and
a DC/DC converter coupled to the one or more supplemental batteries and the main battery.

19. The system of claim 18, wherein the one or more supplemental batteries are configured to provide a voltage of less than approximately 60 VDC.

20. The system of claim 18, wherein the DC/DC converter is configured to convert voltage from the one or more supplemental batteries to a voltage compatible with the main battery.

* * * * *